(12) United States Patent
Turco

(10) Patent No.: US 8,307,662 B2
(45) Date of Patent: Nov. 13, 2012

(54) GAS TURBINE ENGINE TEMPERATURE MODULATED COOLING FLOW

(75) Inventor: John Biagio Turco, West Chester, OH (US)

(73) Assignee: General Electric Company, Schenectady, NY (US)

( * ) Notice: Subject to any disclaimer, the term of this patent is extended or adjusted under 35 U.S.C. 154(b) by 399 days.

(21) Appl. No.: 12/579,674

(22) Filed: Oct. 15, 2009

(65) Prior Publication Data
US 2011/0088405 A1  Apr. 21, 2011

(51) Int. Cl.
*F02C 6/08* (2006.01)
(52) U.S. Cl. .............................. 60/782; 60/785
(58) Field of Classification Search ................. 60/39.83, 60/226.1, 266, 728, 785, 806, 262, 782, 795
See application file for complete search history.

(56) References Cited

U.S. PATENT DOCUMENTS

| | | | |
|---|---|---|---|
| 4,187,675 A | 2/1980 | Wakeman | |
| 4,254,618 A | 3/1981 | Elovic | |
| 4,767,259 A * | 8/1988 | Kurosawa et al. | 415/17 |
| 5,317,877 A * | 6/1994 | Stuart | 60/736 |
| 5,611,197 A * | 3/1997 | Bunker | 60/806 |
| 6,050,079 A | 4/2000 | Durgin et al. | |
| 6,065,282 A | 5/2000 | Fukue et al. | |
| 6,145,497 A * | 11/2000 | Kervagoret et al. | 123/563 |
| 6,182,435 B1 * | 2/2001 | Niggemann et al. | 60/772 |
| 6,584,778 B1 | 7/2003 | Griffiths et al. | |
| 6,612,114 B1 * | 9/2003 | Klingels | 60/785 |
| 6,672,072 B1 | 1/2004 | Giffin, III | |
| 6,860,109 B2 * | 3/2005 | Tsuji | 60/806 |
| 6,968,696 B2 | 11/2005 | Little | |
| 8,056,345 B2 * | 11/2011 | Norris et al. | 60/785 |
| 2005/0050901 A1 | 3/2005 | Little | |
| 2005/0076649 A1 | 4/2005 | Little et al. | |
| 2005/0241320 A1 * | 11/2005 | Blonn et al. | 60/782 |
| 2006/0042266 A1 | 3/2006 | Albers et al. | |
| 2008/0095611 A1 | 4/2008 | Storage et al. | |

(Continued)

FOREIGN PATENT DOCUMENTS
EP  0440164 A1  8/1991
EP  1923539 A2  5/2008

OTHER PUBLICATIONS

Great Britain Search Report issued in connection with GB Application No. GB1017255.9, Feb. 1, 2011.

*Primary Examiner* — Phutthiwat Wongwian
(74) *Attorney, Agent, or Firm* — General Electric Company; David J. Clement; William Scott Andes

(57) ABSTRACT

A gas turbine engine cooling system includes a heat exchanger in fluid communication with a source of cooling air, a first cooling circuit including a first heat exchanger circuit in the heat exchanger and a first bypass circuit with a first bypass valve for selectively bypassing at least a portion of first airflow around the first heat exchanger circuit. A second cooling circuit may be used having a second heat exchanger circuit in the heat exchanger and a shutoff control valve operably disposed in the second cooling circuit upstream of the second heat exchanger circuit and the heat exchanger. A circuit inlet of the first cooling circuit may be used to bleed a portion of compressor discharge bleed air for the first airflow to cool turbine blades mounted on a rotor disk using an annular flow inducer downstream of the first bypass valve and the heat exchanger.

24 Claims, 7 Drawing Sheets

U.S. PATENT DOCUMENTS

| | | |
|---|---|---|
| 2008/0112797 A1 | 5/2008 | Seitzer et al. |
| 2008/0112798 A1 | 5/2008 | Seitzer et al. |
| 2008/0121376 A1* | 5/2008 | Schwarz et al. ......... 165/104.28 |
| 2008/0314573 A1 | 12/2008 | Schwarz et al. |
| 2010/0107593 A1* | 5/2010 | Wang ......................... 60/39.83 |
| 2010/0154434 A1* | 6/2010 | Kubota et al. .................. 60/785 |

* cited by examiner

GAS TURBINE ENGINE TEMPERATURE MODULATED COOLING FLOW

BACKGROUND OF THE INVENTION

1. Technical Field

The present invention relates generally to gas turbine engine cooling flows and, more specifically, to modulating cooling flows for turbine components and for airframe heat loads.

2. Background Information

A typical gas turbine engine of the turbofan type generally includes a forward fan and a booster or low pressure compressor, a middle core engine, and a low pressure turbine which powers the fan and booster or low pressure compressor. The core engine includes a high pressure compressor, a combustor and a high pressure turbine (HPT) in a serial flow relationship. The high pressure compressor and high pressure turbine of the core engine are connected by a high pressure shaft. High pressure air from the high pressure compressor is mixed with fuel in the combustor and ignited to form a high energy gas stream. The gas stream flows through the high pressure turbine, rotatably driving it and the high pressure shaft which, in turn, rotatably drives the high pressure compressor.

The gas stream leaving the high pressure turbine is expanded through a second or low pressure turbine (LPT). The low pressure turbine extracts energy from the gas stream for rotatably driving the fan and booster compressor via a low pressure shaft. The low pressure shaft extends through the high pressure rotor. Most of the thrust produced is generated by the fan. Marine or industrial gas turbine engines have low pressure turbines which power generators, ship propellers, pumps and other devices while turboprops engines use low pressure turbines to power propellers usually through a gearbox.

Since the HPT is subject to the hottest combustion gases discharged from the combustor, various components thereof are typically cooled by bleeding a portion of the pressurized air from the compressor. Any air used for turbine cooling is lost from the combustion cycle and, therefore, reduces overall efficiency of the engine. Each turbine stage includes a row of turbine rotor blades extending radially outwardly from a supporting rotor disk with the radially outer tips of the blades being mounted inside a surrounding turbine shroud. Typically turbine rotor blades of at least the first turbine stage are cooled by the bled portion of the pressurized air from the compressor.

The typical turbofan aircraft engine initially operates at a low power, idle mode and then undergoes an increase in power for takeoff and climb operation. Upon reaching cruise at the desired altitude of flight, the engine is operated at lower, or intermediate power setting. The engine is also operated at lower power as the aircraft descends from altitude and lands on the runway, following which thrust reverse operation is typically employed with the engine again operated at high power. In the various transient modes of operation of the engine where the power increases or decreases, the turbine blades heat up and cool down respectively.

The HPT blades are typically cooled using a portion of high pressure compressor discharge air bled (also known as compressor discharge pressure or CDP air) from the last stage of the compressor. The air is suitably channeled through internal cooling channels inside the hollow blades and discharged through the blades in various rows of film cooling holes from the leading edge and aft therefrom, and also typically including a row of trailing edge outlet holes or slots on the airfoil pressure side. This blade cooling air bypasses the combustion process and therefore further reduces efficiency of the engine.

Blade cooling air is gathered and transferred from static portions of the engine to rotating disks supporting the hollow blades. In order to efficiently transfer the blade cooling air, tangential flow inducers have been designed, usually in the form of a circumferentially disposed array of nozzles to accelerate and turn the cooling flow so as to tangentially inject the cooling flow into rotating rotors at a rotational or tangential speed and direction substantially equal to that of the rotor. Each inducer injects the cooling air flow in a direction that is tangent to the operational direction of rotation of the rotor at an exit hole or orifice at the downstream or aft end of the inducer.

One method to reduce cooling is to cutback cooling flow at low power settings thereby improving efficiency. The traditional approach for modulating physical airflow through an orifice or passage is by increasing and decreasing the flow area at an orifice.

Accordingly, it is desired to provide a gas turbine engine having improved blade cooling control and efficiency.

BRIEF DESCRIPTION OF THE INVENTION

A gas turbine engine cooling system includes a heat exchanger in fluid communication with a source of cooling air, at least a first cooling circuit including a first heat exchanger circuit in the heat exchanger, and a first bypass circuit in the first cooling circuit with a first bypass valve for selectively bypassing at least a portion of first airflow around the first heat exchanger circuit.

A second cooling circuit operably connected to a heat source for cooling the heat source may be included. The second cooling circuit includes a second heat exchanger circuit in the heat exchanger and a shutoff control valve operably disposed in the second cooling circuit upstream of the second heat exchanger circuit and the heat exchanger. The heat source may be in an aircraft airframe or in an electrical power system in the aircraft airframe or in an aircraft gas turbine engine. Alternatively, the second cooling circuit may include a second bypass circuit having a second bypass valve operably disposed in the second bypass circuit upstream of the second heat exchanger circuit and the heat exchanger for selectively bypassing at least a portion of second airflow around the second heat exchanger circuit.

The gas turbine engine cooling system may also include a circuit inlet of the first cooling circuit operable for bleeding a portion of compressor discharge bleed air for the first airflow, the first cooling circuit including an annular flow inducer downstream of the first bypass valve and the heat exchanger, and the flow inducer being in fluid flow communication with a rotor disk and turbine blades mounted on the rotor disk.

The source of cooling air may be an annular bypass duct in an aircraft gas turbine engine.

DETAILED DESCRIPTION OF THE INVENTION

Figure 1:
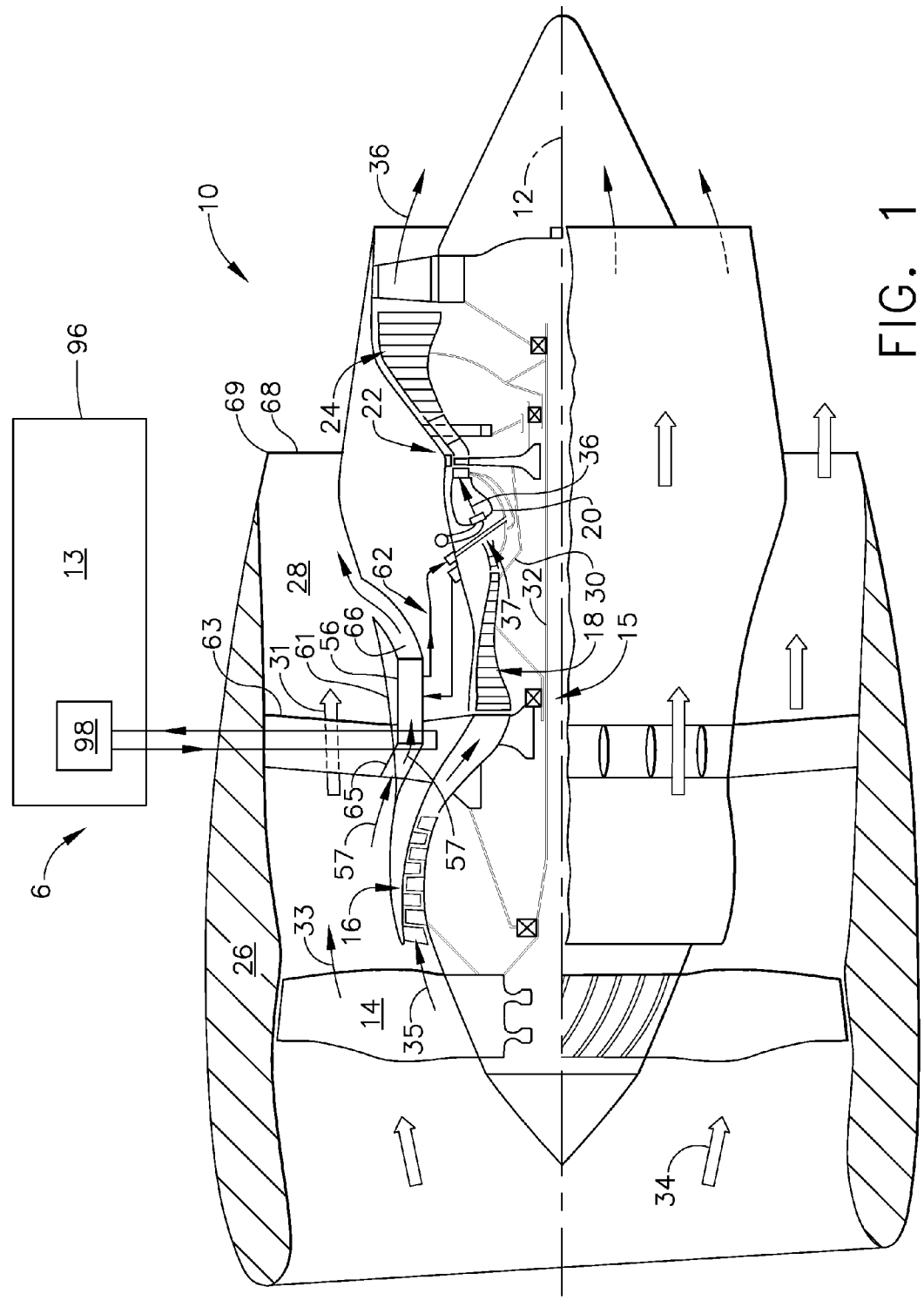
FIG. 1 is an axial sectional schematic view illustration of a gas turbine engine having a temperature modulated cooling flow system.

Illustrated schematically in FIG. 1 is an exemplary turbofan aircraft gas turbine engine 10. The engine 10 is axisymmetrical about a longitudinal or axial centerline axis 12 and is suitably mounted to the wing or a fuselage of an aircraft 13. The engine includes in serial flow communication a fan 14, a low pressure or booster compressor 16, a high pressure (HP) compressor 18, an annular combustor 20, a high pressure turbine (HPT) 22, and a low pressure turbine (LPT) 24. An annular nacelle 26 surrounds the fan 14 and defines an annular bypass duct 28 extending aft around the booster compressor 16. A first drive shaft 30 joins the HPT 22 to the HP compressor 18, and a second drive shaft 32 joins the LPT 24 to the fan 14 and booster compressor 16. A core engine 15 typically includes, in downstream serial flow communication, the high pressure compressor 18, the annular combustor 20, and the HPT 22.

Figure 2:
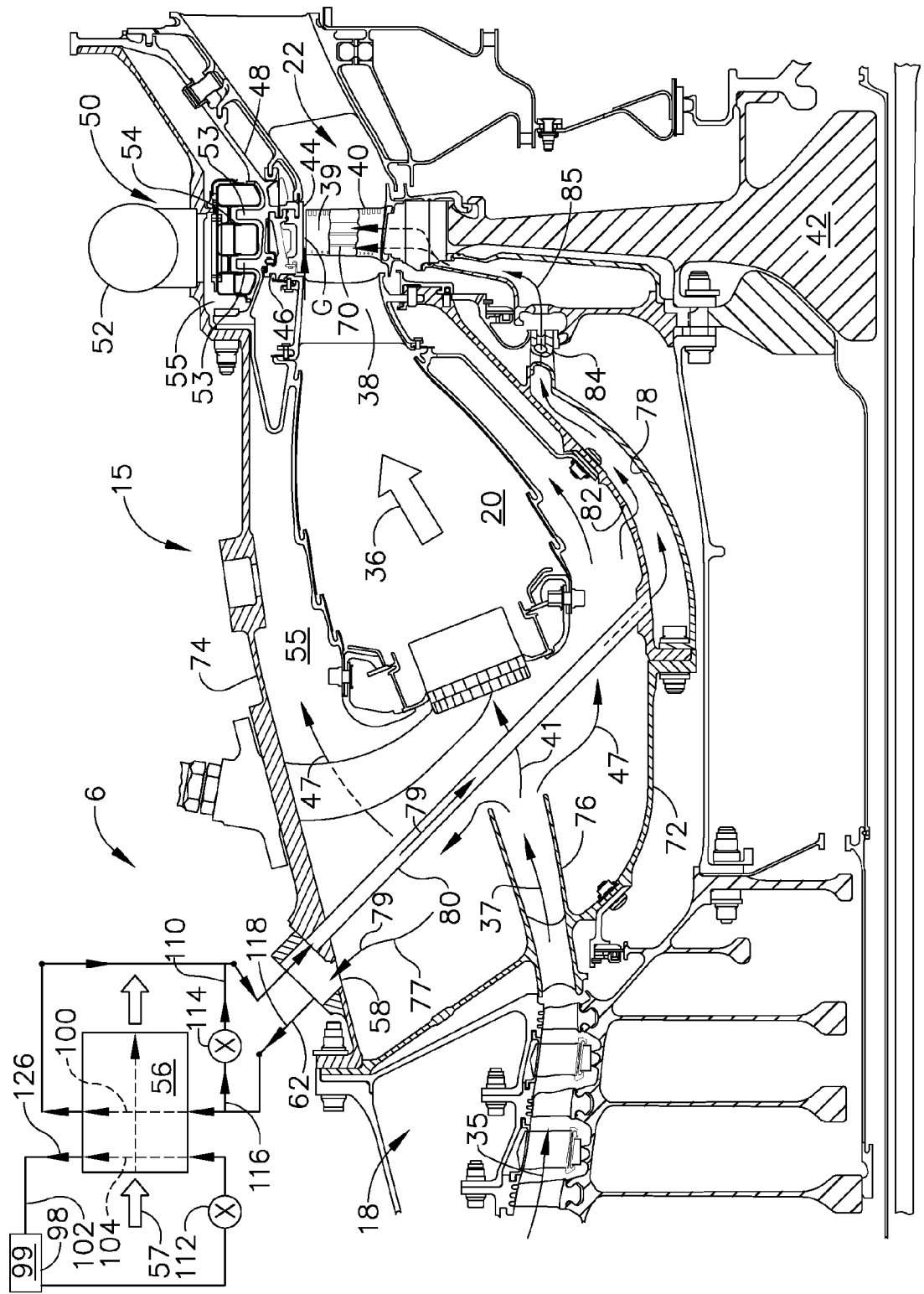
FIG. 2 is an enlarged axial sectional schematic view illustration of the temperature modulated cooling flow system illustrated in FIG. 1 including a cooling circuit used to cool turbine blades in the engine.
Figure 3:
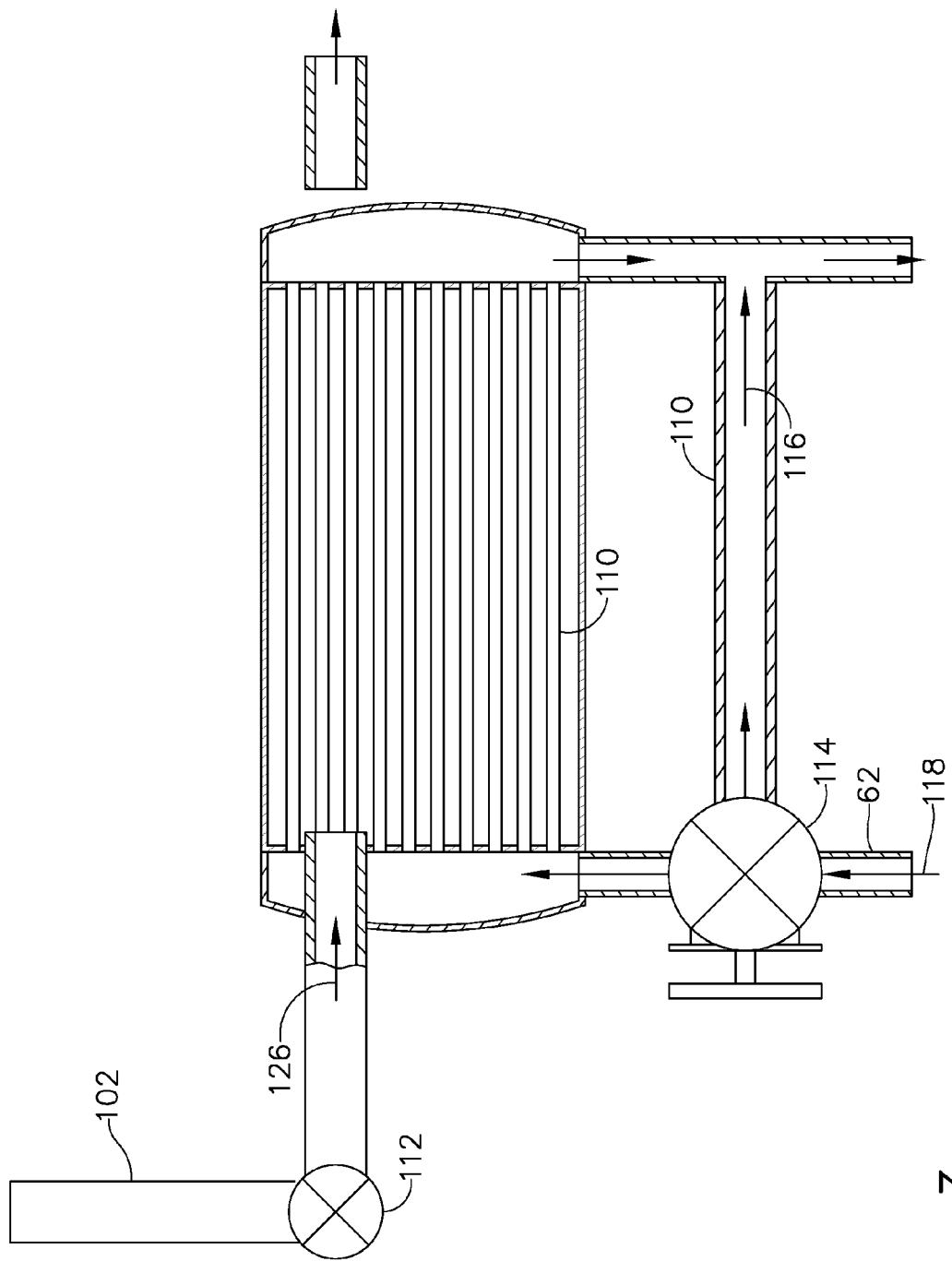
FIG. 3 is an enlarged axial sectional schematic view illustration of a heat exchanger in the temperature modulated cooling flow system illustrated in FIG. 2.

During operation, ambient air 34 enters the inlet of the engine and is pressurized in part by the fan 14 into fan air 33 of which a great part 31 is discharged through the bypass duct 28 for providing a majority of propulsion thrust. A first portion 35 of the fan air 33 passing the fan enters the booster compressor 16 and undergoes a further compression cycle in the multiple axial stages thereof, with additional compression also being provided in the HP compressor 18 in the multiple axial stages thereof. Referring to FIGS. 1 and 2, the pressurized first portion 35 of fan air 33 is discharged as compressor discharge air 37 from the HP compressor 18 and suitably mixed with fuel in the combustor 20 for generating hot combustion gases 36. Energy is extracted from the hot combustion gases 36 in the HPT 22 to drive the first drive shaft 30 and power the HP compressor 18. Additional energy is extracted from the combustion gases in the LPT 24 to drive the second shaft 32 and power the fan 14 and booster compressor 16.

Generally illustrated in FIGS. 1 and 2, is a gas turbine engine temperature modulated cooling system 6 having an air-to-air heat exchanger 56 in fluid communication with a source of cooling air 57 which is illustrated as a portion of the fan air 33. The heat exchanger 56 is suitably mounted in flow communication with the annular bypass duct 28. A first cooling circuit 62 including a first heat exchanger circuit 100 in the heat exchanger 56. A first bypass circuit 110 in the first cooling circuit 62 includes a first bypass valve 114 for selectively bypassing at least a portion 116 of a first airflow 118 in the first cooling circuit 62 around the first heat exchanger circuit 100 and bypassing the heat exchanger 56.

Illustrated in FIGS. 1 and 2, is an exemplary embodiment of the gas turbine engine cooling system 6 further including a second cooling circuit 102 includes a second heat exchanger circuit 104 in the heat exchanger 56 using a second airflow 126. A control valve 112 for modulating or shutting off and turning on the second airflow 126, which may be either a modulating or shutoff valve, is operably disposed in the second cooling circuit 102 upstream of the second heat exchanger circuit 104 and the heat exchanger 56. The second cooling circuit 102 is used to cool a heat producing source or heat source 98 such as may be found in an aircraft airframe 96 or which may be an electrical power system 99 in the aircraft or aircraft gas turbine engine. Thus, the control valve 112 is operably disposed in the second cooling circuit 102 between the heat source 98 and the second heat exchanger circuit 104 and the heat exchanger 56.

Figure 4:
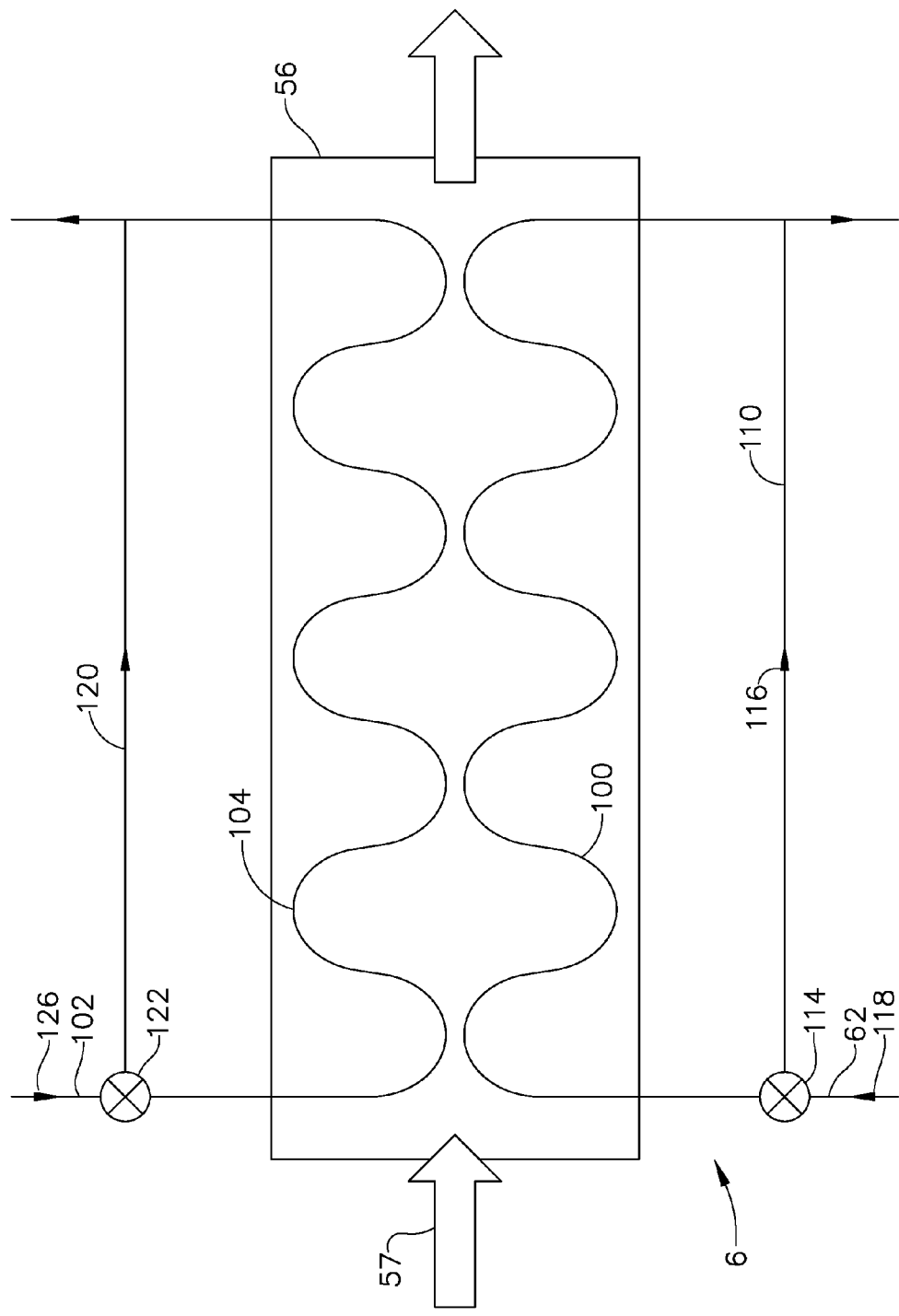
FIG. 4 is a view illustration of alternative cooling circuits in the heat exchanger illustrated in FIG. 1.

Alternatively, as schematically illustrated in FIG. 4, the gas turbine engine cooling system 6 may further include a second bypass circuit 120 in the second cooling circuit 102 with a second bypass valve 122 for selectively bypassing at least a portion of the second airflow 126 in the second cooling circuit 102 around the second heat exchanger circuit 104 and bypassing the heat exchanger 56.

Another embodiment of a gas turbine engine cooling system 6 might only incorporate the first cooling circuit 62 and not the second cooling circuit 102. Other embodiments of a gas turbine engine cooling system 6 might include additional cooling circuits (in addition to the first and second cooling circuits 62, 102) having respective additional heat exchanger circuits.

The exemplary embodiment of a gas turbine engine cooling system 6 illustrated herein uses the first cooling circuit 62 to cool HP turbine blades 40 and the second cooling circuit 102 is used to cool a heat producing source or heat source 98 such as may be found in an aircraft airframe or which may be an electrical power system in the aircraft or aircraft gas turbine engine. The source of cooling air 57 which is illustrated as a portion of the fan air 33 serves as a heat sink used during the above mentioned flight regimes without an additional weight penalty of another heat exchanger and additional weight penalty which is valuable to the overall aircraft system.

The first and second bypass circuits 110, 120 and the first and second bypass valves 114, 122 may be selectively used for bypassing at least a portion 116 of the first airflow 118 and/or the second airflow 126 around the first and/or second heat exchanger circuits 100, 104 respectively. This provides an efficient use of the available source of cooling air 57 and allows the heat exchanger 56 to be minimized in both size and weight.

Referring to FIG. 1, the air-to-air heat exchanger 56 may be conveniently disposed inside a core cowl 61 surrounding a core engine 15 at a base of struts 63 supporting the fan nacelle 26 in suitable flow communication with the bypass duct 28. A suitable inlet scoop 65 may be provided in the core cowl 61 for receiving the cooling air 57 which is channeled aft or downstream through the heat exchanger 56 and through an outlet channel 66 returning the cooing air 57 to the bypass duct 28 prior to a fan outlet 68 at a trailing edge 69 of the nacelle 26.

FIG. 2 illustrates in more detail sections of the core engine 15 including the high pressure compressor 18, annular combustor 20, and HPT 22 disposed in serial flow communication. The HPT 22 includes a first stage or HP turbine nozzle having a row of stator vanes 38 suitably mounted in outer and inner bands. Following the vanes is a single row of HP turbine blades 40 removably mounted to the perimeter or rim of a first stage or HP rotor disk 42. The disk 42 is fixedly joined to the first drive shaft 30 which in turn is fixedly joined to the rotor disks supporting the compressor blades of the high pressure compressor 18.

The configuration and operation of the HP compressor 18 and the HPT 22 are conventional for pressurizing the air 34 and expanding the subsequent combustion gases 36 for extracting energy therefrom. In particular, the pressure and temperature of the first portion 35 of the fan air 33 increases axially in turn as the air flows downstream through all of the stages of the compressor blades. The last row of compressor blades defines the last stage of the high pressure compressor 18 in this exemplary configuration and discharges the pressurized air at a maximum pressure and a correspondingly high temperature associated with the compressor discharge air 37 (CDP air).

Radially outer tips 39 of the turbine blades 40 are radially disposed inside a surrounding turbine shroud 44. The shroud 44 is typically formed in circumferential turbine shroud segments 45 suspended from a supporting annular hanger 46 also formed in segments. The hanger 46 is mounted to a portion of a surrounding annular turbine casing 48 which has a pair of radial ribs or rails 53 spaced between forward and aft mounting flanges. The stationary row of turbine shroud segments 45 surrounds the radially outer tips 39 of the row of rotary turbine blades 40 and is spaced therefrom to define a relatively small radial clearance or gap G having an initial or nominal size.

Leakage of the combustion gases 36 through the gap G during operation correspondingly reduces efficiency of the turbine and the engine. Differential thermal expansion and contraction of the turbine blades 40 mounted on their supporting rotor disk and the suspended turbine shrouds 44 change that nominal radial clearance during the various modes of operation of the engine from takeoff to cruise at elevation and to landing on the runway.

Further illustrated in FIG. 2 are parts of an active clearance control (ACC) system 50 selectively used to cool or heat the turbine casing 48 that supports the row of turbine shrouds 44. The turbine casing 48 itself therefore defines an ACC mount that supports the hanger 46 and shrouds 44 in turn to control the size of the radial tip clearance or gap G. An annular supply manifold 52 surrounds the turbine casing 48 and an annular impingement baffle 54 is suitably mounted inside a plenum 55. A impingement baffle 54 has serpentine portions which closely match the outer profile of two radial rails 53 of the casing 48. Relatively cool or hot air is channeled through the impingement baffle 54 to provide discrete jets of impingement air over the outer surface of the two rails which in turn affects the radial expansion and contraction thereof and the corresponding size of the radial tip gap G during operation.

The core engine 15 further illustrated in FIG. 2 includes radially inner and outer combustor casings 72, 74 which radially inwardly and outwardly respectively surround the combustor 20 and are joined together at the forward ends to a conventional annular diffuser 76. The diffuser 76 is located at an outlet end of the compressor 18 and diffuses the first portion 35 of the fan air 33 discharging it as the compressor discharge air 37. A first portion 47 of the compressor discharge air 37 flows into a plenum 55 surrounding the annular combustor 20 and between the inner and outer combustor casings. A second portion 41 of the compressor discharge air 37 flows into the annular combustor 20. The first cooling circuit 62 includes an annular mixing chamber 78 suitably mounted below the inner combustor casing 72.

Figure 5:
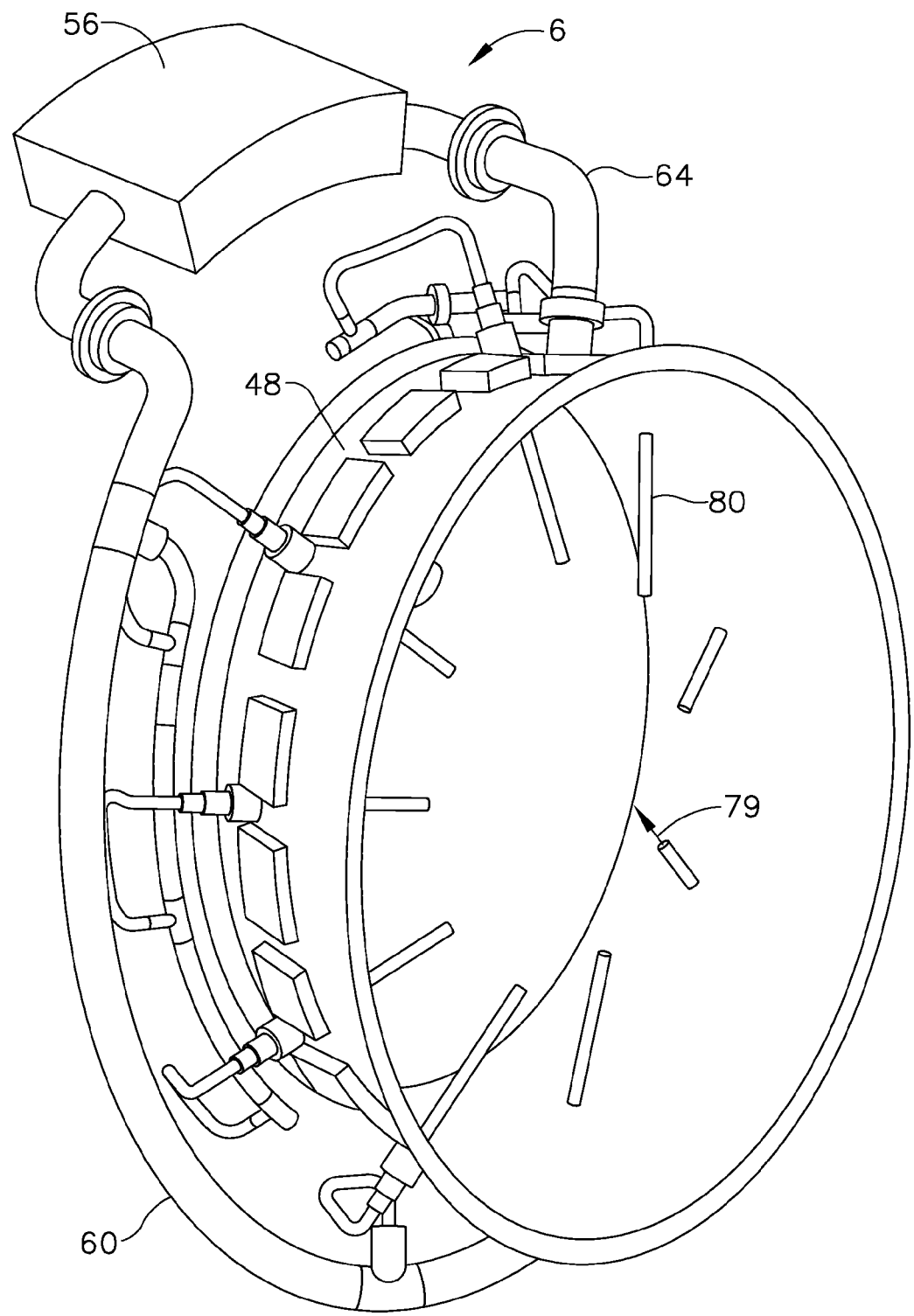
FIG. 5 is a perspective schematic view illustration of inlet and outlet piping and heat exchanger of the temperature modulated cooling flow system illustrated in FIG. 1.

A plurality of circumferentially spaced apart transfer tubes 80 extend radially through the inner and outer combustor casings 72, 74 and in to the mixing chamber 78 and used to return a cooled third portion 77 of the compressor discharge air 37 referred to hereafter as compressor discharge bleed air 79. The compressor discharge bleed air 79 is taken from the last stage of the high pressure compressor 18 through a circuit inlet 58 of the first cooling circuit 62 through the turbine casing 48 and into the first cooling circuit 62 and channeled to a heat exchanger 56. The compressor discharge bleed air 79 is channeled to the heat exchanger 56 from the circuit inlet 58 through a feed tube 60 as illustrated in FIG. 5. After the compressor discharge bleed air 79 is cooled in the heat exchanger 56 it piped back to the plurality of circumferentially spaced apart transfer tubes 80 through a return tube 64 which manifolds the cooled compressor discharge bleed air 79 to the transfer tubes 80.

As illustrated in FIG. 2, the transfer tubes 80 flows the cooled compressor discharge bleed air 79 into the annular mixing chamber 78 suitably mounted below the inner casing 72. The inner casing 72 may also include a row of mixing holes 82 suitably located along the mixing chamber 78 to provide directly thereto some of the first portion 35 of the compressor discharge air 37 to mix with the cooled compressor discharge bleed air 79 in the mixing chamber 78 to prevent over-cooling of the turbine blades 40. The cooled compressor discharge bleed air 79 or the mixture of the first portion 35 of the compressor discharge air 37 and the cooled compressor discharge bleed air 79 in the annular mixing chamber 78 is referred to hereafter as turbine blade cooling air 85 and is used to cool the HP turbine blades 40.

The first cooling circuit 62 further includes an annular flow inducer 84 disposed in fluid flow communication between the outlet end of the chamber 78 and the row of first stage turbine blades 40 extending radially outwardly from their supporting rotor disk. The flow inducer 84 is a stationary component typically including a row of vanes which tangentially accelerates, meters, and/or pressurizes the turbine blade cooling air 85 and injects the turbine blade cooling air 85 into the rotating first stage rotor disk 42. This is a conventional component for efficiently channeling and metering the pressurized turbine blade cooling air 85 to the axial dovetail slots of the disk 42 for flow into the inlets found in the dovetails of the turbine blades 40. The pressurized turbine blade cooling air 85 flows radially outwardly through the blades 40 and cooling channels 70 therein and is discharged through the several rows of outlet holes in the pressure and suction sides of the blade airfoil in a conventional manner.

The gas turbine engine cooling system 6 and in particular the first bypass circuit 110 in the first cooling circuit 62 and its first bypass valve 114 allows modulation of the temperature of the pressurized cooling air 85 directed to the annular flow inducer 84 for cooling the turbine blades 40. This reduces or eliminates valves and metering orifices required with conventional turbine blade cooling flow modulation schemes. The gas turbine engine cooling system 6 described and illustrated herein takes advantage of the physical properties of air to flow more air at low temperatures and less air at high temperatures through a given orifice size thus modulating the cooling flow rate by controlling its temperature.

This system uses the heat exchanger 56 to provide cooled-cooling air so that the turbine blade airfoil materials get maximum cooling flow and lowest temperature cooling source at high power settings. At low-power settings, higher temperature cooling flow or elimination of cooled-cooling may reduce physical cooling flow by as much as 30% without a mechanical modulated orifice, particularly in the hot section of the engine. Significantly increased airframe thermal management capability may be provided when the engine turbine blades or hot section no longer requires the highest cooling levels and the heat exchanger 56, a heat sink, can provide cooling to various aircraft airframe and engine systems. Because the engine is at lower power settings (such as in cruise, decent, or ground operation) during a significant portion of the flight, the airframe can make use of this heat sink. Enabling the airframe or electrical power system to use this heat sink during these flight phases without additional weight penalty is valuable to the overall aircraft system.

Figure 6:
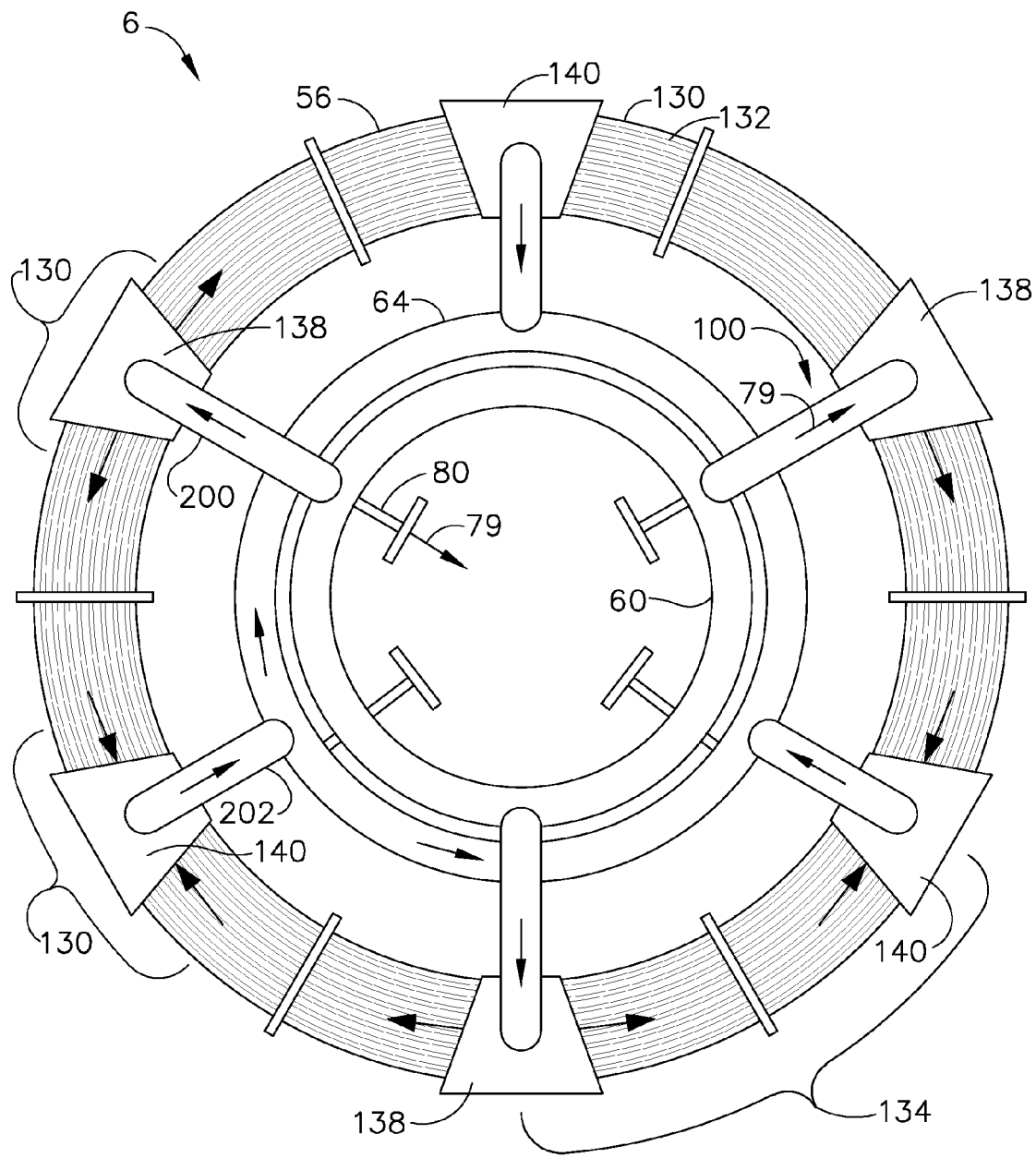
FIG. 6 is an axial sectional schematic view illustration of one embodiment of heat exchanger illustrated in FIG. 1.

Illustrated in FIG. 6 is one embodiment of the heat exchanger 56 in which the first heat exchanger circuit 100 includes a plurality of tube sets 130 having heat transfer tubes 132 between respective header sets 134 of inlet headers 138 and outlet headers 140. The compressor discharge bleed air 79 is channeled to the inlet headers 138 from the feed tube 60, then flowed and cooled through the heat transfer tubes 132 to the respective outlet headers 140, and then channeled to the return tube 64 which manifolds the cooled compressor discharge bleed air 79 to the plurality of circumferentially spaced apart transfer tubes 80. Adjacent tube sets 130 may use common ones of the inlet and outlet headers 138, 140. The first heat exchanger circuit 100 is illustrated in FIG. 6 as having a complete ring of six of the tube sets 130.

The compressor discharge bleed air 79 is channeled to the inlet headers 138 from the feed tube 60 through first feed connectors 200. The cooled compressor discharge bleed air 79 is channeled to the return tube 64 through first return connectors 202 and the return tube 64 manifolds the cooled compressor discharge bleed air 79 to the plurality of circumferentially spaced apart transfer tubes 80.

Alternatively, other numbers of the tube sets 130 may be used and may not be a full ring. The second cooling circuit 102 may have a similar arrangement of tube sets and respective header sets 134 of inlet headers 138 and outlet headers 140 axially or radially adjacent those of the first heat exchanger circuit 100 and may be disposed upstream or downstream or radially offset the first heat exchanger circuit 100.

Figure 7:
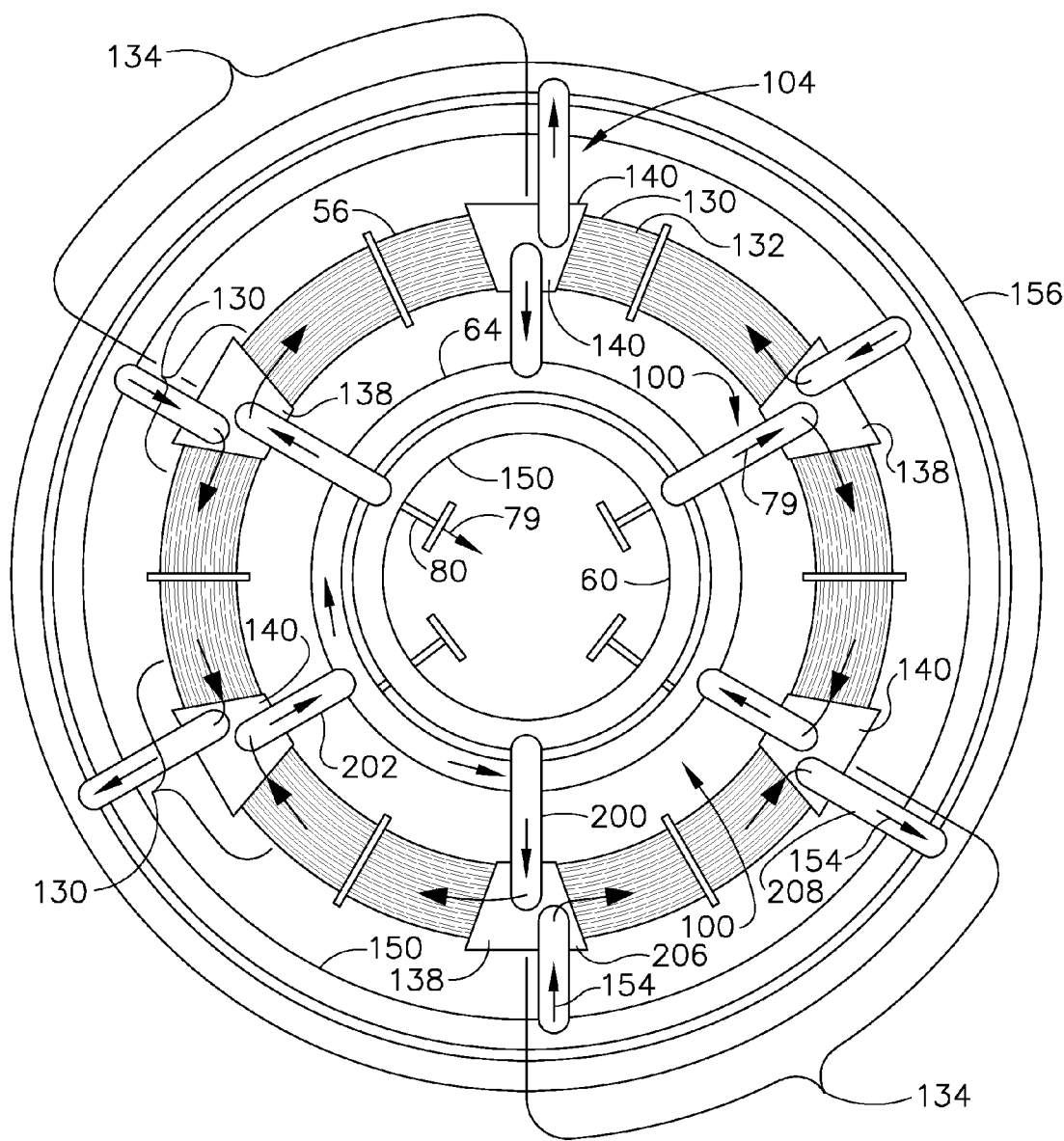
FIG. 7 is an axial sectional schematic view illustration of another embodiment of the heat exchanger illustrated in FIG. 1.

Illustrated in FIG. 7 is another embodiment of the heat exchanger 56 in which the first and second heat exchanger circuits 100, 104 are arranged to alternatively share the same plurality of tube sets 130 and the heat transfer tubes 132 between the respective header sets 134 of the inlet headers 138 and the outlet headers 140. The compressor discharge bleed air 79 is channeled to the inlet headers 138 from the feed tube 60 through first feed connectors 200. Next, the compressor discharge bleed air 79 is flowed and cooled through the heat transfer tubes 132 to the respective outlet headers 140. Then, the cooled compressor discharge bleed air 79 channeled to the return tube 64 through first return connectors 202 and the return tube 64 manifolds the cooled compressor discharge bleed air 79 to the plurality of circumferentially spaced apart transfer tubes 80. Adjacent tube sets 130 may use common ones of the inlet and outlet headers 138, 140.

A feed pipe 150 channels hot heat source airflow 154 from the heat source 98 (illustrated in FIG. 2) through second feed connectors 206 to the inlet headers 138 and then flows and cools the heat source airflow 154 through the heat transfer tubes 132 to the respective outlet headers 140. Next, the cooled heat source airflow 154 is channeled through second return connectors 208 to a return pipe 156 for return to the heat source 98. The first and second bypass valves 114, 122 must be operated so that only compressor discharge bleed air 79 or heat source airflow 154 is allowed to flow to the heat exchanger 56 at any given time. One way valves such as flapper valves may be operably disposed in the first and second cooling circuits 62, 102 to prevent backflow into the heat exchanger through the feed tube 60 or the feed pipe 150.

The gas turbine engine temperature modulated cooling system 6 is operated to modulate the flowrate of the first airflow 118 by modulating the amount or the portion 116 of the first airflow 118 in the first cooling circuit 62 to flow through the first heat exchanger circuit 100 in the heat exchanger 56. The greater the amount or the portion 116 of the first airflow 118 allowed to flow through the first heat exchanger circuit 100 the greater the flowrate of the first airflow 118 delivered to a hot component or components to be cooled such as the HP turbine blades 40. One method of operating the cooling system 6 includes opening the first bypass valve 114 and bypassing the first airflow 118 in the first cooling circuit 62 around the first heat exchanger circuit 100 and the heat exchanger 56 during low power operation such as during cruise, decent, or ground operation. The method also includes closing the first bypass valve 114 and flowing the first airflow 118 in the first cooling circuit 62 through the first heat exchanger circuit 100 in the heat exchanger 56 during high power operation such as during takeoff or climb. This method also allows the airframe to make use of the heat sink capability of the heat exchanger 56 during a significant portion of the flight by operating the control valve 112 to either modulate or open and close the control valve 112 valve in the second cooling circuit 102 to cool the heat producing source or heat source 98 such as may be found in an aircraft airframe 96 or which may be an electrical power system 99 in the aircraft or aircraft gas turbine engine.

The gas turbine engine temperature modulated cooling system 6 uses the physical properties of air to flow more air at low temperatures and less air at high temperatures through a given orifice size. Using cooled-cooling air the turbine materials get maximum cooling flow and lowest temperature cooling source at high power settings. At low-power settings, higher temperature cooling flow or elimination of cooled-cooling will reduce physical cooling flow by as much as 30% without a mechanical modulated orifice. The gas turbine engine temperature modulated cooling system 6 can provide significantly increased airframe thermal management capability when the engine hot section no longer requires the highest cooling levels. Because the engine is at lower power settings (in cruise or decent) during a significant portion of the flight, the airframe can make use of this heat sink. Enabling the airframe or electrical power system to use this heat sink during these flight phases without additional weight penalty is valuable to the overall aircraft system.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:
1. A gas turbine engine cooling system comprising:
a heat exchanger in fluid communication with a source of cooling air,
at least a first cooling circuit including a first heat exchanger circuit in the heat exchanger,
a first bypass circuit in the first cooling circuit including a first bypass valve for selectively bypassing at least a portion of first airflow around the first heat exchanger circuit,
a second cooling circuit including a second heat exchanger circuit in the heat exchanger and a shutoff control valve operably disposed in the second cooling circuit upstream of the second heat exchanger circuit for modulating or shutting off and turning on a second airflow in the second cooling circuit, and
the first and second heat exchanger circuits in fluid communication with the source of cooling air.

2. The gas turbine engine cooling system as claimed in claim 1 further comprising:
a circuit inlet of the first cooling circuit operable for bleeding a portion of compressor discharge bleed air for the first airflow,
the first cooling circuit including an annular flow inducer downstream of the first bypass valve and the heat exchanger, and
the flow inducer in fluid flow communication with a rotor disk and turbine blades mounted on the rotor disk.

3. The gas turbine engine cooling system as claimed in claim 2 further comprising the first heat exchanger circuit including a plurality of tube sets having heat transfer tubes between respective header sets of inlet headers and outlet headers.

4. A gas turbine engine cooling system comprising:
a heat exchanger in fluid communication with a source of cooling air,
at least a first cooling circuit including a first heat exchanger circuit in the heat exchanger,
a first bypass circuit in the first cooling circuit including a first bypass valve for selectively bypassing at least a portion of first airflow around the first heat exchanger circuit,
a second cooling circuit including a second heat exchanger circuit in the heat exchanger and a shutoff control valve operably disposed in the second cooling circuit upstream of the second heat exchanger circuit for modulating or shutting off and turning on a second airflow in the second cooling circuit, and
the second cooling circuit operably connected to a heat source for cooling the heat source.

5. The gas turbine engine cooling system as claimed in claim 4 further comprising the heat source being in an aircraft airframe or in an electrical power system in the aircraft airframe or in an aircraft gas turbine engine.

6. A gas turbine engine cooling system comprising:
a heat exchanger in fluid communication with a source of cooling air,
at least a first cooling circuit including a first heat exchanger circuit in the heat exchanger,
a first bypass circuit in the first cooling circuit including a first bypass valve for selectively bypassing at least a portion of first airflow around the first heat exchanger circuit,
a circuit inlet of the first cooling circuit operable for bleeding a portion of compressor discharge bleed air for the first airflow,
the first cooling circuit including an annular flow inducer downstream of the first bypass valve and the heat exchanger,
the flow inducer in fluid flow communication with a rotor disk and turbine blades mounted on the rotor disk,
a second cooling circuit including a second heat exchanger circuit in the heat exchanger and a shutoff control valve operably disposed in the second cooling circuit upstream of the second heat exchanger circuit for modulating or shutting off and turning on a second airflow in the second cooling circuit, and
the second cooling circuit operably connected to a heat source for cooling the heat source.

7. The gas turbine engine cooling system as claimed in claim 6 further comprising the heat source being in an aircraft airframe or in an electrical power system in the aircraft airframe or in an aircraft gas turbine engine.

8. A gas turbine engine cooling system comprising:
a heat exchanger in fluid communication with a source of cooling air,
at least a first cooling circuit including a first heat exchanger circuit in the heat exchanger,
a first bypass circuit in the first cooling circuit including a first bypass valve for selectively bypassing at least a portion of first airflow around the first heat exchanger circuit,
a second cooling circuit including a second heat exchanger circuit in the heat exchanger,
a second bypass circuit in the second cooling circuit, and
a second bypass valve operably disposed in the second bypass circuit upstream of the second heat exchanger circuit for selectively bypassing at least a portion of second airflow around the second heat exchanger circuit.

9. The gas turbine engine cooling system as claimed in claim 8 further comprising the second cooling circuit operably connected to a heat source for cooling the heat source.

10. The gas turbine engine cooling system as claimed in claim 9 further comprising the heat source being in an aircraft airframe or in an electrical power system in the aircraft airframe or in an aircraft gas turbine engine.

11. An aircraft gas turbine engine comprising:
in serial flow communication a fan, a high pressure compressor, an annular combustor, a high pressure turbine for powering the high pressure compressor, and a low pressure turbine for powering the fan,
an annular nacelle surrounding the fan circumscribes an annular bypass duct located radially inwardly thereof,
a gas turbine engine cooling system includes a heat exchanger in fluid communication with a source of cooling air on the engine,
at least a first cooling circuit including a first heat exchanger circuit in the heat exchanger,
a first bypass circuit in the first cooling circuit including a first bypass valve for selectively bypassing at least a portion of first airflow around the first heat exchanger circuit,
the source of cooling air being the annular bypass duct,
a second cooling circuit including a second heat exchanger circuit in the heat exchanger and a shutoff control valve operably disposed in the second cooling circuit upstream of the second heat exchanger circuit for modulating or shutting off and turning on a second airflow in the second cooling circuit, and
the first and second heat exchanger circuits in fluid communication with the source of cooling air.

12. The engine as claimed in claim 11 further comprising the second cooling circuit operably connected to a heat source for cooling the heat source.

13. The engine as claimed in claim 12 further comprising the heat source being in an aircraft airframe or in an electrical power system in the aircraft airframe or in an aircraft gas turbine engine.

14. An aircraft gas turbine engine comprising:
in serial flow communication a fan, a high pressure compressor, an annular combustor, a high pressure turbine for powering the high pressure compressor, and a low pressure turbine for powering the fan,
an annular nacelle surrounding the fan circumscribes an annular bypass duct located radially inwardly thereof,
a gas turbine engine cooling system includes a heat exchanger in fluid communication with a source of cooling air on the engine,
at least a first cooling circuit including a first heat exchanger circuit in the heat exchanger, a first bypass circuit in the first cooling circuit including a first bypass valve for selectively bypassing at least a portion of first airflow around the first heat exchanger circuit, the source of cooling air being the annular bypass duct, a second cooling circuit including a second heat exchanger circuit in the heat exchanger and a shutoff control valve operably disposed in the second cooling circuit upstream of the second heat exchanger circuit for modulating or shutting off and turning on a second airflow in the second cooling circuit, and the second cooling circuit operably connected to a heat source for cooling the heat source.

15. The engine as claimed in claim 14 further comprising the heat source being in an aircraft airframe or in an electrical power system in the aircraft airframe or in an aircraft gas turbine engine.

16. An aircraft gas turbine engine comprising:
in serial flow communication a fan, a high pressure compressor, an annular combustor, a high pressure turbine for powering the high pressure compressor, and a low pressure turbine for powering the fan,
an annular nacelle surrounding the fan circumscribes an annular bypass duct located radially inwardly thereof,
a gas turbine engine cooling system includes a heat exchanger in fluid communication with a source of cooling air on the engine,
at least a first cooling circuit including a first heat exchanger circuit in the heat exchanger,
a first bypass circuit in the first cooling circuit including a first bypass valve for selectively bypassing at least a portion of first airflow around the first heat exchanger circuit,
the source of cooling air being the annular bypass duct,
and a shutoff control valve operably disposed in a second cooling circuit upstream of the second heat exchanger circuit,
a circuit inlet of the first cooling circuit operable for bleeding a portion of compressor discharge bleed air for the first airflow,
the first heat exchanger circuit including a plurality of tube sets having heat transfer tubes between respective header sets of inlet headers and outlet headers,
the second cooling circuit including a second heat exchanger circuit in the heat exchanger,
a second bypass circuit in the second cooling circuit, and
a second bypass valve operably disposed in the second bypass circuit upstream of the second heat exchanger circuit for selectively bypassing at least a portion of second airflow around the second heat exchanger circuit.

17. The engine as claimed in claim 16 further comprising the second cooling circuit operably connected to a heat source for cooling the heat source.

18. The engine as claimed in claim 17 further comprising the heat source being in an aircraft airframe or in an electrical power system in the aircraft airframe or in an aircraft gas turbine engine.

19. An aircraft gas turbine engine comprising:
in serial flow communication a fan, a high pressure compressor, an annular combustor, a high pressure turbine for powering the high pressure compressor, and a low pressure turbine for powering the fan,
an annular nacelle surrounding the fan circumscribes an annular bypass duct located radially inwardly thereof,
a gas turbine engine cooling system includes a heat exchanger in fluid communication with the annular bypass duct,
at least a first cooling circuit including a first heat exchanger circuit in the heat exchanger,
a first bypass circuit in the first cooling circuit including a first bypass valve for selectively bypassing at least a portion of first airflow around the first heat exchanger circuit,
a circuit inlet of the first cooling circuit operable for bleeding a portion of compressor discharge bleed air for the first airflow,
the first cooling circuit including an annular flow inducer downstream of the first bypass valve and the heat exchanger,
the flow inducer in fluid flow communication with a rotor disk and turbine blades mounted on the rotor disk,
the first heat exchanger circuit including a plurality of tube sets having heat transfer tubes between respective header sets of inlet headers and outlet headers,
a second cooling circuit including a second heat exchanger circuit in the heat exchanger,
a second bypass circuit in the second cooling circuit, and
a second bypass valve operably disposed in the second bypass circuit upstream of the second heat exchanger circuit for selectively bypassing at least a portion of second airflow around the second heat exchanger circuit.

20. A method for cooling gas turbine engine components comprising:
flowing a first airflow from a compressor of a gas turbine engine through a first cooling circuit including a first heat exchanger circuit in a heat exchanger to one or more hot components,
flowing cooling air through the heat exchanger,
selectively bypassing at least a portion of the first airflow around the first heat exchanger circuit and the heat exchanger,
controllably cooling a heat producing source using a second cooling circuit including a second heat exchanger circuit in the heat exchanger, and
modulating or shutting off and turning on the second airflow with a control valve operably disposed in the second cooling circuit upstream of the second heat exchanger circuit and the heat exchanger.

21. The method as claimed in claim 20 further comprising the heat source being in an aircraft airframe, or in an electrical power system in the aircraft airframe, or in an aircraft gas turbine engine.

22. The method as claimed in claim 20 further comprising:
bleeding a portion of compressor discharge air for the first airflow,
then flowing the first airflow to an annular flow inducer in the first cooling circuit downstream of the first bypass valve and the heat exchanger, and
then flowing the first airflow from the flow inducer to a rotor disk and then to turbine blades mounted on the rotor disk.

23. The method as claimed in claim 20 further comprising selectively bypassing at least a portion of second airflow around the second heat exchanger circuit.

24. The method as claimed in claim 20 further comprising flowing the cooling air from an annular bypass duct circumscribed by an annular nacelle surrounding a fan of the engine and through the heat exchanger.

* * * * *